(12) United States Patent
Pechtold

(10) Patent No.: US 7,219,695 B2
(45) Date of Patent: May 22, 2007

(54) HYDROGEN VALVE WITH PRESSURE EQUALIZATION

(75) Inventor: Rainer Pechtold, Russelsheim (DE)

(73) Assignee: General Motors Corporation, Detroit, MI (US)

( * ) Notice: Subject to any disclaimer, the term of this patent is extended or adjusted under 35 U.S.C. 154(b) by 33 days.

(21) Appl. No.: 11/155,184

(22) Filed: Jun. 17, 2005

(65) Prior Publication Data

US 2006/0283510 A1  Dec. 21, 2006

(51) Int. Cl.
*F16K 1/44* (2006.01)
(52) U.S. Cl. .............................. 137/625.33; 251/129.21
(58) Field of Classification Search ........... 137/625.33, 137/625.35, 625.5, 590; 251/129.21, 282; 123/DIG. 12
See application file for complete search history.

(56) References Cited

U.S. PATENT DOCUMENTS

| | | | | |
|---|---|---|---|---|
| 3,985,333 A | * | 10/1976 | Paulsen | 251/282 |
| 4,429,716 A | * | 2/1984 | Conrad | 137/625.35 |
| 5,263,514 A | * | 11/1993 | Reeves | 137/625.33 |
| 5,584,323 A | * | 12/1996 | Yamamuro | 137/625.65 |
| 5,607,137 A | * | 3/1997 | Kanda et al. | 251/282 |
| 5,816,560 A | * | 10/1998 | Obser | 251/129.15 |
| 5,927,257 A | * | 7/1999 | Hackett | 251/282 |
| 5,992,219 A | * | 11/1999 | Otaka | 137/590 |
| 6,415,820 B1 | * | 7/2002 | Gluf, Jr. | 137/625.65 |

* cited by examiner

*Primary Examiner*—John Fox
(74) *Attorney, Agent, or Firm*—John A. Miller; Warn, Hoffmann, Miller & Ozga, P.C.

(57) ABSTRACT

A shut-off valve that has particular application for opening and closing a compressed hydrogen storage tank. In one embodiment, the valve includes two valve sealing members where one side of one valve sealing member is on the high pressure side of the valve and an opposing side of the other valve sealing member is on the high pressure side of the valve. Therefore, the pressure applied to the two valve sealing members offset each other so that less force is required to open the valve against the high pressure. In another embodiment, one of the sealing members is replaced with a bellows.

5 Claims, 3 Drawing Sheets

HYDROGEN VALVE WITH PRESSURE EQUALIZATION

BACKGROUND OF THE INVENTION

1. Field of the Invention

This invention relates generally to a valve including pressure equalization and, more particularly, to a shut-off valve for a compressed hydrogen tank, where the valve includes two inlet ports that provide pressure equalization so that the valve can be opened with reduced force at high inlet pressures.

2. Discussion of the Related Art

Hydrogen is a very attractive fuel because it is clean and can be used to efficiently produce electricity in a fuel cell. The automotive industry expends significant resources in the development of hydrogen fuel cell systems as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Many fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

In some vehicle fuel cell systems, hydrogen is stored in one or more compressed gas tanks under high pressure on the vehicle to provide the hydrogen necessary for the fuel cell system. The pressure in the tank can be upwards of 700 bar. In one known design, the compressed gas tank may include an inner plastic liner that provides a gas tight seal for the hydrogen, and an outer carbon fiber composite layer that provides the structural integrity of the tank. Because hydrogen is a very light and diffusive gas, the inner liner must be carefully engineered in order to act as a permeation barrier. The hydrogen is removed from the tank through a pipe. At least one pressure regulator is provided that reduces the pressure of the hydrogen within the tank to a pressure suitable for the fuel cell system.

Further, a shut-off valve is required either in the tank or just outside of the tank that closes the tank when the fuel cell system is off. A stiff spring is typically used to maintain the valve in the closed position and prevent hydrogen leaks. Because the pressure in the compressed hydrogen tank may be very high, the pressure difference between the inlet side and the outlet side of the shut-off valve may be very large. Therefore, the force required to open the valve against the pressure difference and the spring bias is significant. Electromagnets are sometimes used in these types of shut-off valves to open the valve. However, electromagnets are generally not the most desirable valve choice because of the amount of energy required to open the valve, and the size and weight of the electromagnet.

SUMMARY OF THE INVENTION

In accordance with the teachings of the present invention, a shut-off valve is disclosed that has particular application for opening and closing a high pressure compressed gas storage tank. In one embodiment, the valve includes two valve sealing members where one side of one valve sealing member is on the high pressure inlet side of the valve and an opposing side of the other valve sealing member is on the high pressure inlet side of the valve. Therefore, the pressure applied to the two valve sealing members offset each other so that less force is required to open the valve. In an alternate two valve sealing member design for an in-tank use, a shaft on which the sealing members are mounted includes an internal channel for providing the high pressure to the sealing members. In another embodiment for the in-tank use, one of the sealing members is replaced with a bellows. Other embodiments may include other pressure equalization designs consistent with the discussion herein.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a shut-off valve that provides pressure equalization is merely exemplary in nature, and is in no way intended to limit the invention or its applications or uses. For example, the shut-off valve of the invention has particular application for a compressed hydrogen storage tank in a fuel cell system. However, as will be appreciated by those skilled in the art, the shut-off valve of the invention may have other applications.

Figure 1:
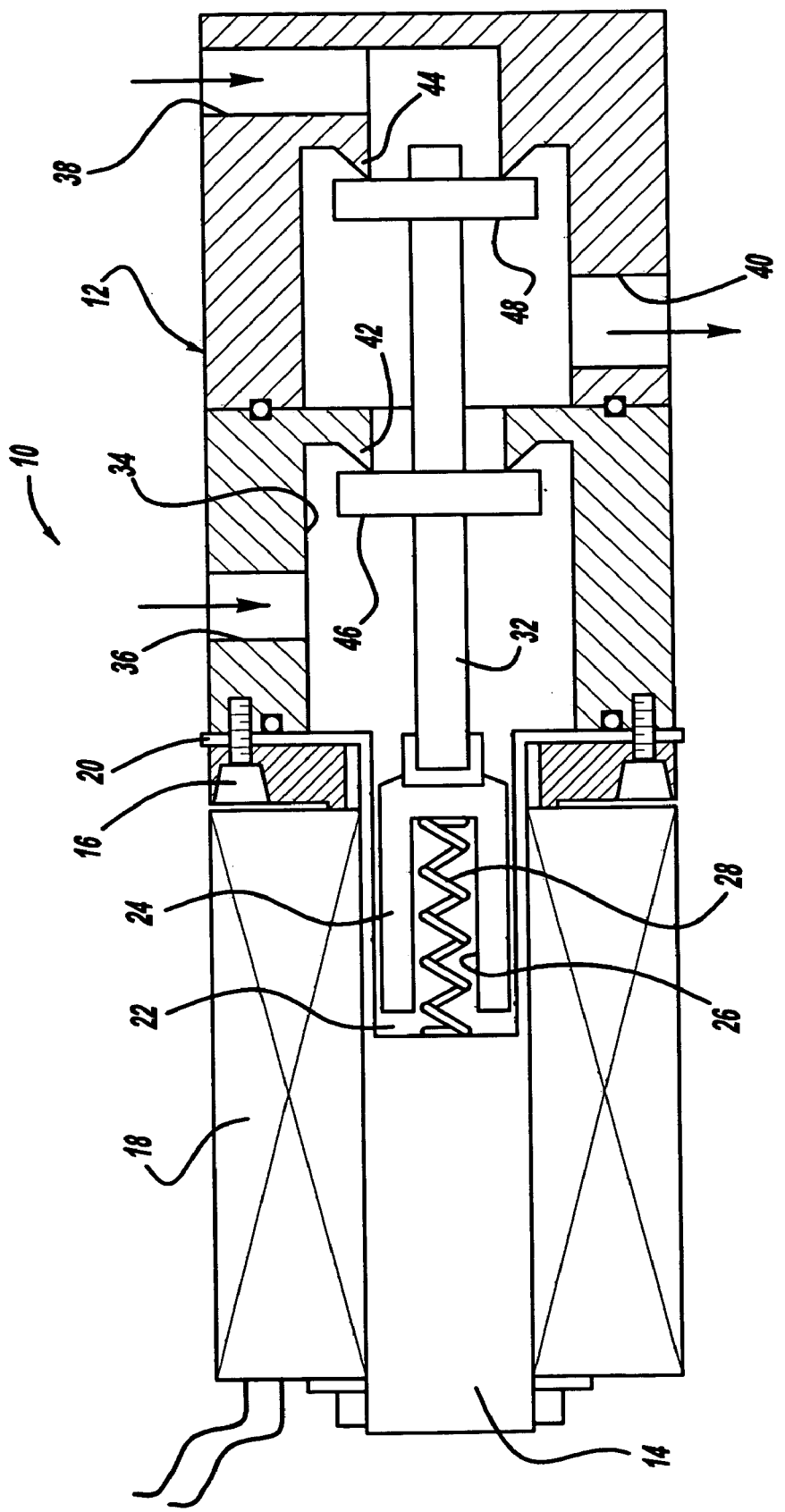
FIG. 1 is a cross-sectional view of a shut-off valve including two valve sealing members that provide pressure equalization, according to an embodiment of the present invention.

FIG. 1 is a cross-sectional view of a shut-off valve 10 that has application for opening and closing a compressed hydrogen storage tank in a fuel cell system, according to an embodiment of the present invention. The shut-off valve 10 includes a valve body 12 mounted to a flange 20 of a cylindrical support member 14 by bolts 16. An electromagnetic coil 18 is wound around the member 14, as shown. The member 14 includes an internal bore 22 in which is positioned a cylindrical pole piece member 24 also having an internal bore 26. A spring 28 is positioned within the bore 26 against an inside surface of the cylindrical member 14, as shown. A shaft 32 is mounted to the pole piece member 24 opposite to the spring 28, and extends into a valve chamber 34 within the body 12.

The body 12 includes a first valve seat 42 and a second valve seat 44. A first annular sealing member 46 is mounted to the shaft 32 proximate the valve seat 42 and a second annular sealing member 48 is mounted to the shaft 32 proximate the valve seat 44. The body 12 also includes two inlet ports 36 and 38 and one outlet port 40. The inlet ports 36 and 38 are at tank pressure, which may be upwards of 700 bar for a compressed hydrogen tank associated with a fuel cell system. This pressure from the inlet ports 36 and 38 is introduced into the chamber 34 so that it forces the sealing member 46 against the valve seat 42 and the sealing member 48 away from the valve seat 44. This configuration provides the pressure equalization of the valve 10. The bias of the spring 28 in combination with the pressure equalization from the inlet ports 36 and 38 forces the sealing member 46 to seat against the valve seat 42 and the sealing member 48 to seat against the valve seat 44 when the coil 18 is not energized. This is the default closed position of the valve 10 when hydrogen flow is not desired.

The electromagnetic coil 18 is energized to open the shut-off valve 10. The magnetic field generated by the coil 18 moves the pole piece member 24 and the shaft 32 against the bias of the spring 28 so that the sealing member 46 moves away from the valve seat 42 and the sealing member 48 moves away from the valve seat 44. Therefore, hydrogen entering the inlet ports 36 and 38 is allowed to flow through the chamber 34 and out of the outlet port 40. Because of the pressure equalization, the electromagnetic force provided by the coil 18 does not need to overcome the pressure within the tank, and therefore the amount of energy required to open the valve 10 against the bias of the spring 28 does not need to be significant.

Figure 2:
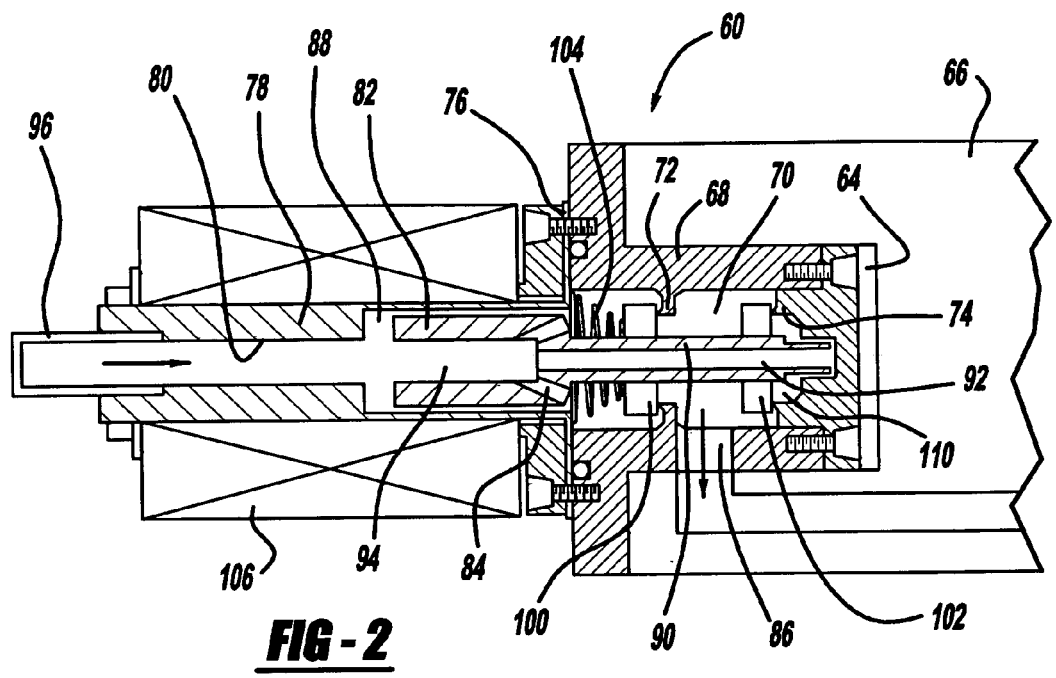
FIG. 2 is a cross-sectional view of a shut-off valve including two valve sealing members for providing pressure equalization that has particular application for the inside of a high pressure gas storage tank, according to another embodiment of the present invention.
Figure 3:
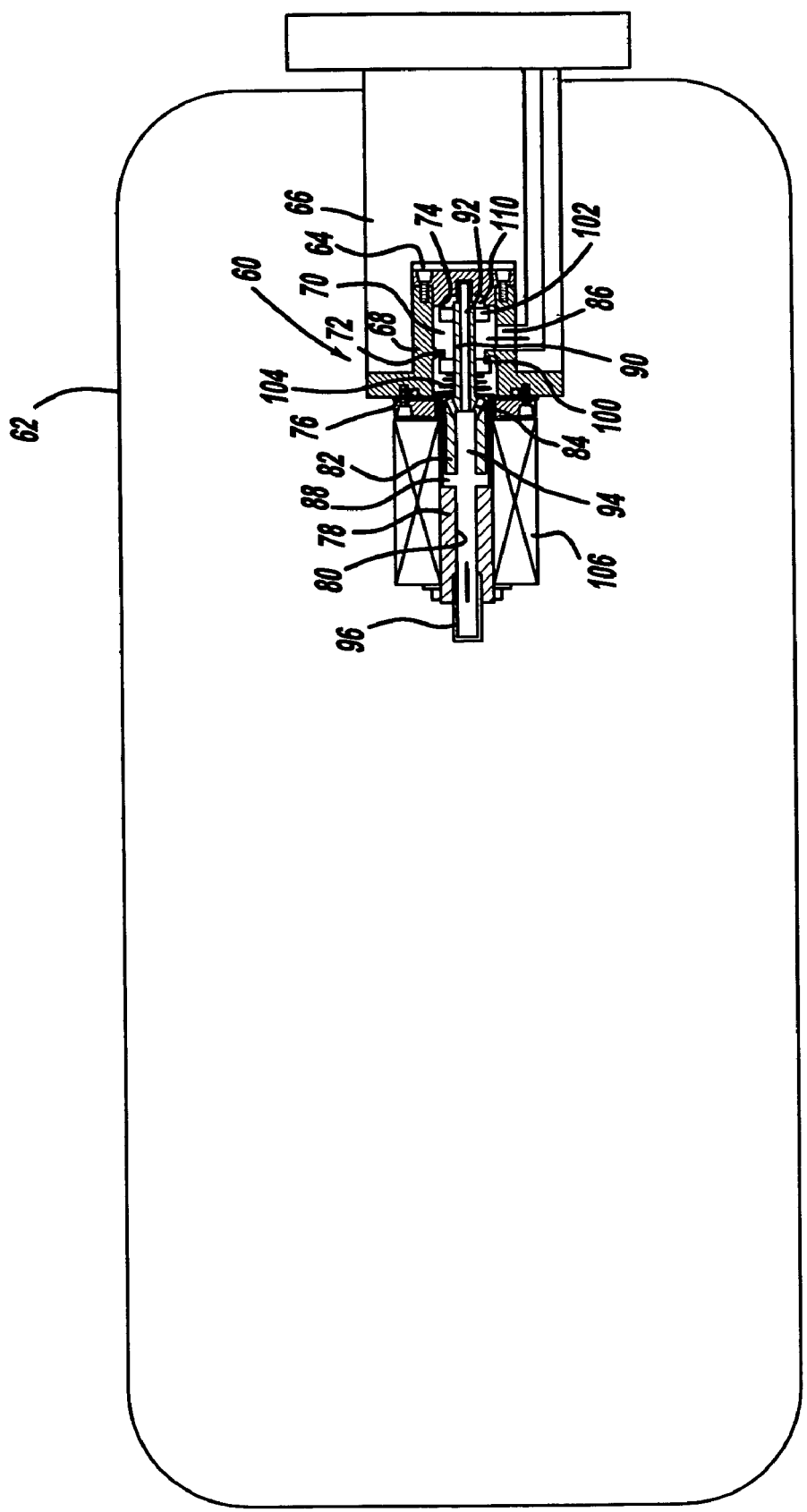
FIG. 3 is a cross-sectional view of the shut-off valve shown in FIG. 2 within the high pressure gas storage tank.

The shut-off valve 10 has particular application for a compressed hydrogen tank where the valve 10 would be positioned outside of the tank. However, in other designs, it may be desirable to provide the shut-off valve within the tank. FIG. 2 is a cross-sectional view of a shut-off valve 60 similar to the valve 10 that provides pressure equalization, and is designed for the inside of a pressure tank, according to another embodiment of the present invention. FIG. 3 is a cross-sectional view of the valve 60 positioned within a pressure tank 62, where the shut-off valve 60 is mounted within a bore 64 of an adapter 66. The adapter 66 connects the pressure tank 62 to the outside environment. The adapter 66 may contain several components, such as sensors, valves, filters, etc., depending on the particular design. In this embodiment, a valve body 68 of the valve 60 is positioned within the bore 64. The valve body 68 includes a valve chamber 70, a first valve seat 72 and a second valve seat 74. An outlet port 86 extends through the adapter 64 to the outside environment to remove hydrogen from the tank 62.

The valve body 68 is mounted to a flange 76 of a cylindrical member 78. An internal bore 80 extends completely through the member 78. A cylindrical pole piece member 82 is positioned within an expanded portion 88 of the bore 80 proximate the valve body 68, as shown. The pole member 82 includes orifices 84 that allow the bore 80 to be in fluid communication with the chamber 70. A shaft 90 is mounted to the pole member 82, where the shaft 90 includes an internal bore 92 also in fluid communication with the bore 80 through a central bore 94 of the member 82. A filter 96 is mounted over the bore 80 at an open end of the member 78 to prevent particles and the like from entering the bore 80.

A first annular sealing member 100 is mounted to the shaft 90 proximate the valve seat 72 and a second annular sealing member 102 is mounted to the shaft 90 proximate the valve seat 74. A spring 104 is positioned in the chamber 70 between and in contact with the sealing member 100 and the pole member 82, as shown. An electromagnetic coil 106 is wrapped around the cylindrical member 78 and is used to open the valve 60.

The valve 60 is shown in its closed position where the coil 106 is not energized so that the spring 104 forces the first sealing member 100 against the first valve seat 72 and the second sealing member 102 against the second valve seat 74. Hydrogen pressure within the tank 62 enters the bore 80 through the filter 96, then through the bore 94, and through the orifices 84 to apply pressure in combination with the spring bias 104 against the sealing member 100 to force it against the valve seat 72. The hydrogen pressure within the tank 62 also enters a sub-chamber 110 in the valve chamber 70 through the bore 92 to force the sealing member 102 away from the valve seat 74. Therefore, the high pressure within the tank 62 is equalized by this configuration. When the valve 60 is to be opened, the coil 106 is energized which magnetically draws the pole member 82 towards the left against the bias of the spring 104 to lift the sealing member 100 off the valve seat 72 and the sealing member 102 off the valve seat 74 to allow the hydrogen to flow from the chamber 70 into the outlet port 74.

Figure 4:
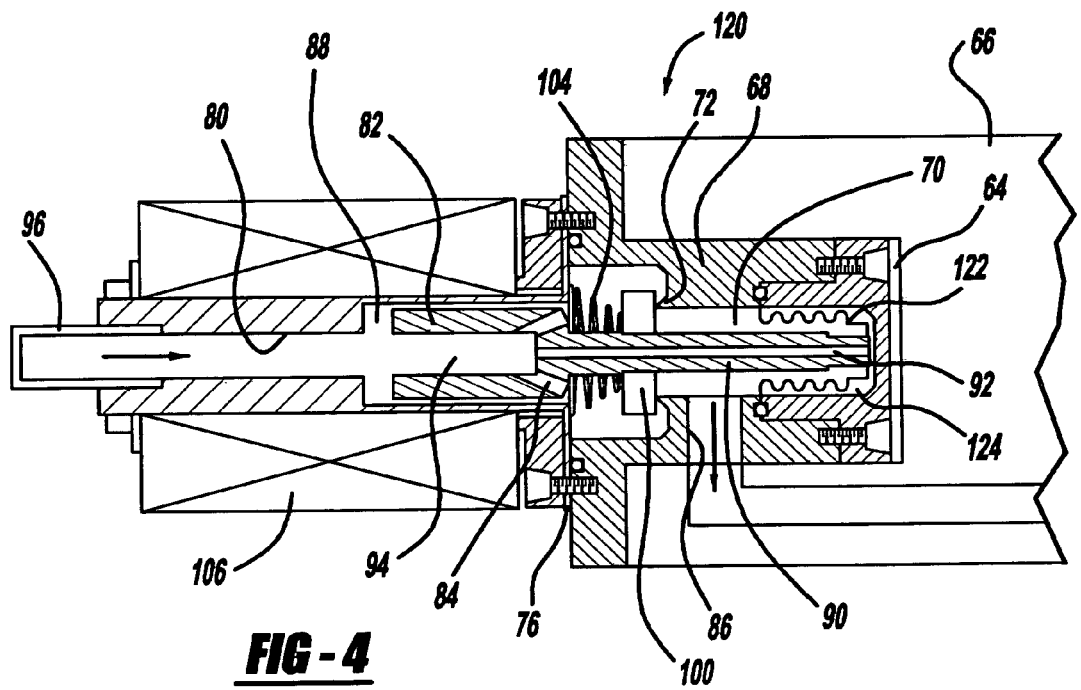
FIG. 4 is a cross-sectional view of a shut-off valve including a valve sealing member and a bellows for providing pressure equalization that has particular application for the inside of a high pressure gas storage tank, according to another embodiment of the present invention.

FIG. 4 is a cross-sectional view of a shut-off valve 120 similar to the shut-off valve 60, where like elements are identified by the same reference numeral, according to another embodiment of the invention. In this embodiment, the second sealing member 102 and the second valve seat 74 are eliminated, and are replaced with a bellows 122. The bellows 122 is mounted to the valve body 68 and an end of the valve shaft 90 to create a bellows chamber 124. When the valve 120 is closed, high pressure from the tank 62 pushes the sealing member 100 against the valve seat 72, and provides pressure to the bellows chamber 124. The pressure in the bellows chamber 124 pushes against an opposite side of the sealing member 100 away from the valve seat 72 to provide the pressure equalization, as discussed above. When the coil 106 is energized, the pole member 82 and the shaft 90 move to the left causing the bellows 122 to contract. Because the valve 120 only has one valve seat, high precision production processes are not required.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A shut-off valve comprising:
   a valve body defining a valve chamber therein, said valve body including a first seat and a second valve seat and an outlet port;
   a coil mounting structure mounted to the valve body and including an internal bore extending completely therethrough;
   an electromagnetic coil wound on the coil mounting structure;
   a shaft extending into the internal bore of the coil mounting structure, said shaft including a shaft bore extending therethrough and being in fluid communication with the internal bore of the coil mounting structure at one end and the valve chamber at an opposite end, said shaft including a first sealing member mounted to the shaft proximate to the first valve seat and a second sealing member mounted to the shaft proximate to the second valve seat, said shaft further including a shaft port in fluid communication with the valve chamber on one side of the first sealing member, wherein the end of the shaft bore in fluid communication with the valve chamber is in fluid communication with the valve chamber on an opposite site of the second sealing member, and wherein input pressure applied to the end of the internal bore of the coil mounting structure opposite to the valve body causes the first sealing member to seat against the first valve seat and the second sealing member to be forced away from the second valve seat to provide pressure equalization; and a spring applying a spring bias to the first sealing member to cause the first sealing member to seat against the first valve seat.

2. The shut-off valve according to claim 1 further comprising a filter mounted to the coil mounting structure opposite to the valve body for filtering a gas.

3. The shut-off valve according to claim 1 wherein the shut-off valve is a shut-off valve for a compressed hydrogen tank.

4. The shut-off valve according to claim 3 wherein the shut-off valve is located inside of the compressed hydrogen tank.

5. The shut-off valve according to claim 4 wherein the valve body is mounted to an adapter within the compressed hydrogen tank.

\* \* \* \* \*